Jan. 3, 1933.  J. N. SCHNEIDER  1,892,969
INDICATOR SNAP GAUGE
Filed Oct. 1, 1931
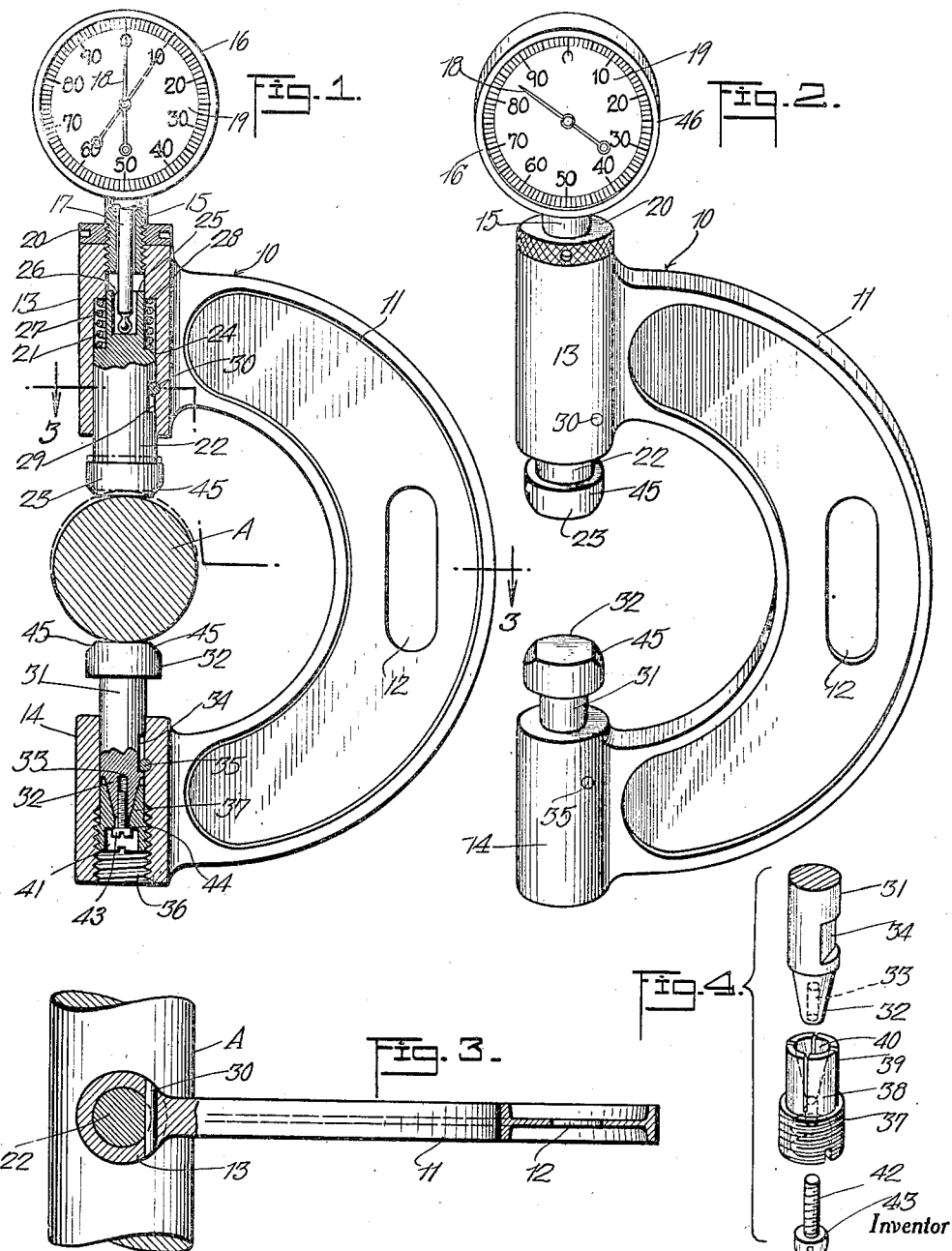
Inventor
John N. Schneider.
By Clarence A. O'Brien
Attorney

Patented Jan. 3, 1933

1,892,969

UNITED STATES PATENT OFFICE

JOHN N. SCHNEIDER, OF NEW BRUNSWICK, NEW JERSEY

INDICATOR SNAP GAUGE

Application filed October 1, 1931. Serial No. 566,340.

The primary object of the invention resides in an instrument which may be set to accurately check the correct size of a piece of work and which will indicate the amount of any variance in the size, that is, if the piece of work is oversized or undersized.

Another object of the invention is to provide a snap gauge in which the accuracy of the work is assured; loss of time in setting gauges by an inspector is eliminated; and the human element usually dependent in the use of the conventional form of gauge is abolished.

A further object of the invention is the provision of an indicator snap gauge which is simple of construction, inexpensive of manufacture, easy to handle when in use, and strong and durable for the purpose intended.

With these and other objects in view, the invention resides in the certain novel construction, combination and arrangement of parts, the essential features of which are hereinafter fully described, are particularly pointed out in the appended claim, and are illustrated in the accompanying drawing, in which:

Figure 1 is a front elevational view of my improved snap gauge showing parts in section, the dotted line on the indicator gauge showing the position of the same when the work is oversized.

Figure 2 is a perspective view of the snap gauge.

Figure 3 is a horizontal sectional view on the line 3—3 of Fig. 1, and

Figure 4 is a perspective view of the several parts forming the anvil adjusting means, the said parts being shown in a separated condition.

Referring to the drawing by reference characters, the numeral 10 designates my improved indicator snap gauge in its entirety which includes a yoke shaped frame 11 constructed of steel and which is provided centrally with a hand grip opening 12. The terminal ends of the yoke frame 11 are provided with axially alined tubular housing 13 and 14, the outer end of the housing 13 being screw threaded to receive the threaded nipple 15 of a standard indicator 16, and which indicator includes an actuating rod 17 slidable through the nipple 15 and which also extends into the bore of the housing 13. The standard indicator 16 includes an indicating hand 18 and a dial 19 which is graduated to indicate ten-thousandths of an inch. The indicator 16 is fixedly secured to the tubular housing 13 by a lock nut 20 which is threaded to the nipple 15 and is screwed tight against the outer end of the housing 13.

Slidably mounted in the enlarged bore 21 of the housing 13 is a slidable anvil 22, the outer extending end of which is provided with an enlarged head 23, while the inner end of the anvil is reduced in diameter to provide a shoulder 24 and a reduced tubular extension 25. The extension 25 is provided with a recess 26 opening through the inner end thereof and which receives the free end of the actuating rod 17. A coil spring 27 surrounds the tubular extension 25 and has one end seated against the shoulder 24 and its opposite end seated against the shoulder 28 formed in the housing 13. This spring tends to normally extend the headed end of the anvil outwardly beyond the inner end of the housing 13, and for limiting the sliding movement of the anvil in opposite directions, I provide a slot 29 in one side of the anvil and extend a stop pin 30 transversely through the housing 13 and slot 29. It will therefore be seen that this slot permits of a limited sliding movement of the anvil in opposite directions.

Extending into the inner end of the housing 14 is an adjustable anvil 31, the outer end of which is provided with an enlarged head 32, while the inner end of the anvil 31 terminates in a tapered or conical portion 32, while formed in this end of the anvil is a threaded bore 33. One side of the anvil 31 is slotted or notched as at 34 and passing transversely through the housing 14 is a stop pin 35 which also passes through the slot 34. This pin and slot connection serves to limit the adjustment of the anvil 31 in opposite directions.

The outer end of the bore formed in the housing 14 is screw threaded as at 36 for threadedly receiving an adjusting screw 37, the said screw being provided with an extension portion 38 which is provided with oppositely disposed slots 39 which slots open onto the outer end of the extension portion 38. The portion 38 of the adjusting screw is provided with a conical seat 40 which opens through the opposite end of the screw and which end is provided with an enlarged recess 41. Extending through a passage in the adjusting screw 37 is a lock screw 42, the shank of which is threaded into the threaded bore 33 provided in the inner end of the anvil 31, while the head 43 of the screw is adapted to engage a shoulder 44 formed within the adjusting screw 37. It will therefore be seen that when the locking screw 42 is screwed into the recess 33, the inner end of the anvil 31 will be drawn down upon the conical seat 40 which in turn will set up a wedging action to expand the resilient wall of the adjusting screw against the walls of the bore formed in the housing 14. By loosening the screw 42 and turning the adjusting screw 37, the anvil 31 may be set to the desired adjustment within the limits of its sliding movement, and after being moved to the desired position the lock screw 42 is again screwed home in order to set up the clamping action between the split or slotted end of the locking screw and the wall of the bore in the housing 14.

In practice, the instrument is set for the checking of a piece of work of a desired size, but before setting the instrument, the piece of work is checked with a micrometer or master set block in order that the size of the work may be correctly obtained. In Figure 1 of the drawing I have shown a shaft A of the size to be checked and the snap gauge is adjusted accordingly, that is, the anvil 31 is moved to the adjustment desired. When so adjusted, the indicating hand 18 of the standard indicator may normally indicate a negative amount as shown in Figure 2 of the drawing, but when the gauge is snapped onto the work A, the anvil 22 will be moved inwardly and during such movement the same actuates the actuating rod 17 whereupon the hand 18 moves to the zero mark on the dial. For the purpose of guiding the anvil to position with respect to the work, I bevel the front and back of the heads 23 and 32 as at 45. The beveled surfaces act as guides for applying the gauge to the work A. In the event that the work A should be oversized, the hand 18 will move to a position beyond the zero mark or as shown in dotted lines in Figure 1, whereupon it is readily understood that the size of the work does not measure up to the specification. On the other hand if the work is undersized, it will also show on the standard indicator as the indicating hand 18 will be short of the zero mark, whereupon it is readily understood that the work is not in accordance with the specifications.

From the foregoing description, it will be seen that I have provided an indicator snap gauge which is accurate in use, which is not affected by expansion and contraction due to the heat from the hand of the user, and which is a common annoyance in gauges now in use which affect the accuracy of the same. Furthermore, the device is constructed to withstand shocks to which instruments of this kind are subjected during handling and in the event that the standard indicator 16 should become out of adjustment, it may be reset. In the present instance, I have shown that type of standard indicator 16 in which the hand may be adjusted by the turning of the outer ring 46. Although this one type of standard indicator has been illustrated in the drawing, it will be understood that various other types may be substituted therefor if desired. It will also be appreciated that although one instrument may be constructed to measure sizes within a certain range, other size indicators may be constructed to measure within other ranges.

While I have shown and described what I deem to be the most desirable embodiment of my invention, I wish it to be understood that various changes that come within the scope of the appended claim may be resorted to if desired.

Having thus described the invention, what I claim as new and desire to secure by Letters Patent is:—

An indicating instrument comprising a yoke frame having axially alined tubular housings at the ends thereof, an indicating mechanism mounted on said frame and having an actuating rod extending into one of said housings, a slidable anvil mounted in the housing and engageable with said actuating rod upon inward movement thereof, spring means acting upon said slidable anvil to normally move the same to an extended position, and a stationary anvil mounted in the other of said housings, and means for fixedly adjusting said stationary anvil relative to said slidable anvil, said means including an adjustable screw threaded into said last mentioned housing and having expansible walls, a conical seat in said adjusting screw, the inner end of said stationary anvil being tapered and engaging said seat, and means for forcing and securing the tapered end upon said seat to cause a wedging action therebetween to expand the expansible walls of said screw into engagement with the inner walls of said housing.

In testimony whereof I affix my signature.

JOHN N. SCHNEIDER.